United States Patent
Nakata, deceased et al.

[15] 3,671,616
[45] June 20, 1972

[54] METHOD OF MANUFACTURING BALL-PENS

[72] Inventors: Tozaburo Nakata, deceased, late of Tokyo, Japan; by Fusahide Nakata, heir, 4-14 Kita 1-chome, Loenji-Suginami-ku, Japan

[22] Filed: Aug. 6, 1970

[21] Appl. No.: 61,862

Related U.S. Application Data

[63] Continuation of Ser. No. 716,873, March 27, 1968, abandoned.

[30] Foreign Application Priority Data

March 30, 1967 Japan..................................42/20120

[52] U.S. Cl..............................264/68, 264/249, 264/318, 264/328
[51] Int. Cl......................................................B29d 23/00
[58] Field of Search.....................264/68, 242, 249, 318, 328

[56] References Cited

UNITED STATES PATENTS

| | | | |
|---|---|---|---|
| 2,921,343 | 1/1960 | Mumford | 264/318 x |
| 3,166,618 | 1/1965 | Fehling | 264/242 |
| 3,254,147 | 5/1966 | Nakada | 264/242 |
| 3,325,576 | 6/1967 | Kessler | 264/318 |

Primary Examiner—Robert F. White
Assistant Examiner—Richard R. Kucia
Attorney—McGlew & Toren

[57] ABSTRACT

Ball pen tips are made of a heat moldable synthetic resin by molding and a steel ball is inserted in an inwardly diverging ball-embracing recess of the molded tip then the outwardly opening ball-embracing tip portion is squeezed under pressure during heating at predetermined temperatures.

4 Claims, 5 Drawing Figures

PATENTED JUN 20 1972

3,671,616

INVENTOR.
TOZABURO NAKATA, DECEASED
BY McGlew and Toren
Attorneys

METHOD OF MANUFACTURING BALL-PENS

This is a continuation of Ser. No. 716,873, filed Mar. 27, 1968, now abandoned.

BRIEF SUMMARY OF THE INVENTION

This invention relates to a method of manufacturing ball pens using a heat moldable synthetic resin as a material for ball-pen tips embracing a steel ball.

Conventional ball-pen tips usually have been made of yellow copper. Nevertheless, it has been understood to some extent for long that if nylon resin or acetal resin is used as a substitute for copper yellow, the friction coefficient of the tip against the steel ball can be reduced considerably, thus permitting the manufacture of writing instruments sufficiently resistant to friction and easy to handle.

However, in the practical molding of ball-pen tips of synthetic resin, there has occurred great difficulty in ensuring accurate finished measurements and in devising suitable processing steps. This has resulted in failure to produce good-quality products of this kind. Therefore, it is the basic object of the present invention to provide a method of manufacturing ball pens capable of overcoming the above mentioned drawback in manufacture and suitable for mass production of ball-pens. In manufacturing ball-pen tips having an ink flow-out hole, ink flow-out grooves communicating with the flow-out hole and a steel ball-embracing portion communicating with the grooves, in accordance with the present invention, the ball-embracing portion of the tip is molded with a ball-receiving recess which diverges inwardly from the ink exit opening. A small steel ball is inserted into this recess, for temporary support therein, and the exit portion of the ball-embracing portion is squeezed inwardly under pressure while being heated at predetermined temperatures.

BRIEF DESCRIPTION OF THE DRAWINGS

For an understanding of the principles of the invention, reference is made to the following description of a typical embodiment thereof as illustrated in the accompanying drawing.

DETAILED DESCRIPTION

Figure 1:
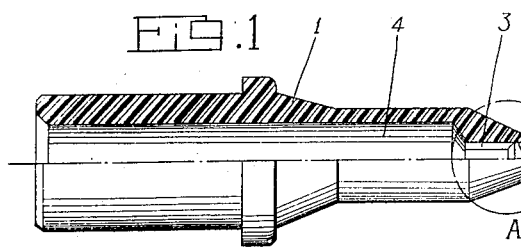
Figure 2:
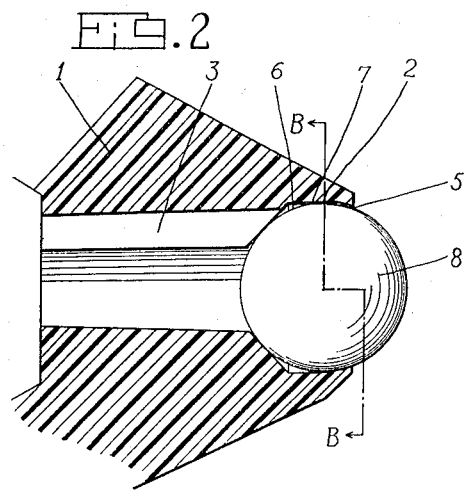
Figure 3:
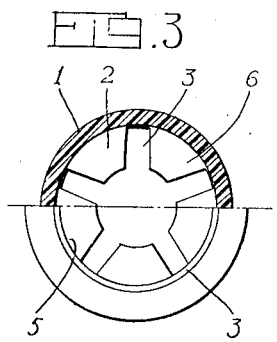

Referring to the drawings, and particularly to FIG. 1, a ball-pen tip 1 is made of a suitable plastic composition material such as, for example, an acetal resin, the tip being manufactured by conventional injection molding means. The shape of the tip, after molding, is best illustrated in FIGS. 2 and 3. Thus, the outer or exit end of tip 1 is formed with an embracing portion 2 for a steel ball 8, and this embracing portion includes a recess communicating with ink flow-out grooves 3 in turn communicating with an ink flow-out aperture or passage 4 at their inner ends. The inner surface 7, extending from the ink exit opening 5 of ball-embracing portion 2 to the inner part 6 thereof, is so undercut as to form an inversely tapered portion diverging inwardly at an angle $\alpha$ between 1° and 5°. Thus the internal diameter of the opening 5 is smaller than that of the inner part 6. The ball-pen tip of the above mentioned shape is molded by the metal dies and apparatus as shown in FIG. 4.

Figure 4:
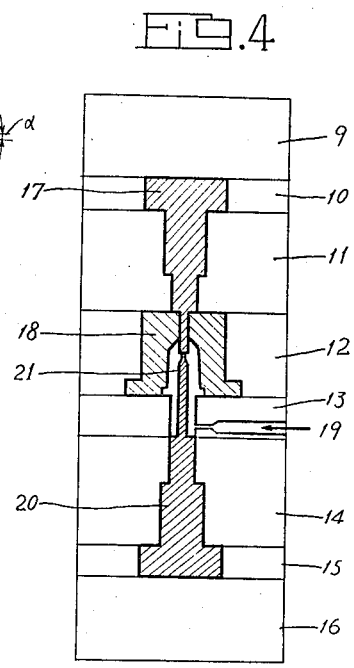

Referring to FIG. 4, the injection molding apparatus includes a backing plate 9 for a core pin 17 insertable into a mold cavity member 18 mounted in a positioning plate 12, a positioning plate 10 fixing the lateral position of core pin 17. The core pin is inserted through a guide plate 11. A second backing plate 16 is provided for a shouldered core pin 14 also insertable into the cavity 21 of mold cavity member 18 in substantial alignment with the inner end of core pin 17. A plate 15 laterally positions core pin 20, and the core pin is inserted through a guide plate or block 14 and through a mold gate member 13 serving to retain mold cavity member 18 in plate or block 12. Mold gate member 13 includes a passage 19 for injection of molding material into the cavity 21 to fill that portion of the cavity not occupied by the pins 17 and 20 and also to fill that portion of plate 13 not occupied by the pin 20. The tip of the inner end of core pin 17 is formed as an arrow head in axial section to define the recess in the ball embracing portion 2 of tip 1.

In using the apparatus shown in FIG. 4, melted resin is injected by pressure through gate 19 and, after the resin has at least partially set, but before it has fully set, the molding core pins 17 and 20 are retracted, and the molded ball-pen tip 1 is ejected from cavity 21. The ball-embracing portion 2 of the tip 1 is molded by means of the core pin 17 with the arrow tip. After ejection of the molded resin, the core pin 17 with the arrow tip is drawn out from the ball-embracing portion 2 before the melted resin becomes completely hard. However, because of the provision of the inversely tapered inwardly diverging portion of the inner surface 7, the internal diameter o the opening 5 is caused to expand until it becomes equivalent to that of the inner part 6. However after drawing out the core pin 17 with the arrow tip, it returns nearly to its original size. At the same time, because of the above mentioned resin is somewhat still elastic in its hardened state, it is possible to mold it into the required size even under the above mentioned changes in shape.

Figure 5:
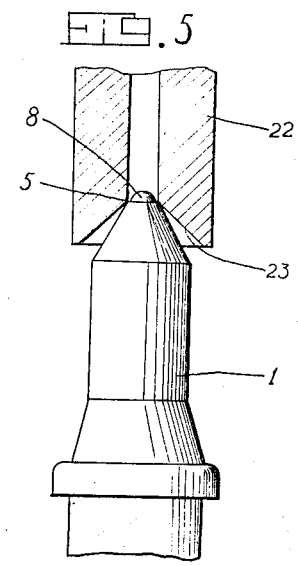

Then the steel ball 8 is inserted in the ball-embracing portion 2 of the molded tip 1. Since the steel ball 8 has a spherical diameter conformable to the inner part 6 of the ball-embracing portion 2, the opening 5 at that time can be sufficiently expanded for insertion of the steel ball 8 therein. The steel ball 8 thus inserted is supported by means of the inner undercut part 7 so that it is prevented from falling out of the ball-embracing portion 2. Referring to FIG. 5, the squeezing apparatus, indicated at 22, has a heater therein to maintain it at a predetermined temperature. The operative end of member 22 is formed with a conical or inclined surface 23, defining an inwardly conical bowl.

In order to squeeze the ink exit end of the tip 1, the apparatus 22 is rotated at 3,000 r.p.m. and the conical surface 23 is pressed against the opening 5 of the tip 1 while the apparatus is pushing downwardly as viewed in FIG. 5. Due to frictional heat developed and heating by the apparatus itself, the temperature of the tip 1 is elevated until it reaches the softening point of the resin, namely, about 130° C, so that the opening 5 can be squeezed inwardly along the inclined surface 23.

On cooling, the resin becomes hard and, particularly on sudden cooling, its hardness will increase with the result that the ball-pen is already completed at this stage. According to the manufacturing method of the present invention, the ball-pen tip is formed with an inversely tapered, inwardly diverging bag-like ball-retaining portion for insertion of a steel ball therein immediately after molding of the resin. Therefore, when the tip, with a ball inserted therein, is subjected to the operation of the squeezing apparatus, the steel ball does not dislodge easily, since it is held stably in position in the embracing portion. The ink exit end of the tip is squeezed or reduced at an inclined angle of 45°, in the same manner as customary in the manufacture of known ball-pen tips. However, it is not uncommon for a ball-pen tip, placed on a turn-table to be dislodged from the turn table due to centrifugal force of the table and due to its moment of inertia at the instant of its stopping action. However, according to the present invention, such a possibility is avoided due to the supporting function of the inwardly diverging tapered ball retaining portion of the tip. In the squeezing or reducing operation at the ink exit end of the ball-pen tip, satisfactory results can be obtained with a minimum of pressure application due to the fact that the ball-embracing portion is formed with the inwardly diverging tapered recess. Also, the area of the ball-pen tip which is squeezed may be made so small that the squeezing operation can be easily effected. Finally, the present invention avoids the inconvenience of the steel ball becoming immovable after the squeezing operation, as well as avoiding any obstruction to ink flow.

In ball-pen tips manufactured by the method of the present invention, the material used can be an acetal resin, a nylon resin, or the like, so that the coefficient of friction against the steel ball is a great deal less than the coefficient of friction of yellow copper against the steel ball. Thus, it is possible to manufacture ball-pen tips with a great reduction in the friction between the parts. An additional advantage is that, while conventional ball point pens have been restricted to using oily ink, the present invention provides ball point pens capable of using water-soluble ink without any difficulty, due to the fact that the material of the tip has a low coefficient of friction with respect to the steel ball.

What is claimed is:

1. A method of manufacturing synthetic resin ball point pen tips having an ink supply opening, ink flow grooves communicating with the supply opening, and a ball-receiving recess having an ink inlet communicating with the grooves and having an ink exit opening, said method comprising the steps of injecting molten synthetic resin into a mold cavity concluding two-part molding core means and forming one part contoured to define said ink supply opening and said grooves and another part contoured to define an undercut tapered ball-receiving recess diverging inwardly at an angle between 1° to 5° from said ink exit opening toward said ink inlet, for forming a synthetic resin ball point pen tip in which the cross-sectional area of said ink exit opening is less than that of said recess immediately inwardly of said exit opening; withdrawing said other mold core part outwardly through said ink exit opening after said synthetic resin has partially set and remains flexible but before said synthetic resin has completely set and becomes rigid; removing the formed tip from the mold cavity; pressing, through said ink exit opening into said ball-receiving recess, a metal ball having a diameter in excess of that of said ink exit opening so that the ball contacts the undercut tapered ball-receiving surface and also contacts the interior surface of said tip axially inwardly from the undercut surface at the ink inlet; placing a conically shaped squeezing surface having an angle of about 45° in contact with the external periphery of said tip, heating the tip, and rotating the squeezing surface at about 3,000 rpm and pressing the squeezing surface axially against said tip so that the material of said tip reaches about 130° C and the surface of the recess is squeezed inwardly into contact with the ball from the ink exit end of said tip to a plane extending transversely of the axis of said tip and spaced axially from said ink inlet.

2. A method of manufacturing synthetic resin ball point pen tips, as claimed in claim 1, in which said synthetic resin is an acetal resin.

3. A method of manufacturing synthetic resin ball point pen tips, as claimed in claim 1, in which said synthetic resin is a nylon resin.

4. A method of manufacturing synthetic resin ball point pen tips, as claimed in claim 1, comprising the step of squeezing the surface of the undercut tapered ball-receiving recess inwardly into contact with the ball from a plane extending through the center of the ball and perpendicularly to the axis of said tip to the ink exit of said tip.

* * * * *